(12) United States Patent
Yin

(10) Patent No.: US 6,809,812 B2
(45) Date of Patent: Oct. 26, 2004

(54) SPECTRAL ANALYSIS SYSTEM WITH MOVING OBJECTIVE LENS

(75) Inventor: Huiqu Yin, West Lafayette, IN (US)

(73) Assignee: SpectraCode, Inc., Lafayette, IN (US)

( * ) Notice: Subject to any disclaimer, the term of this patent is extended or adjusted under 35 U.S.C. 154(b) by 426 days.

(21) Appl. No.: 09/877,773

(22) Filed: Jun. 8, 2001

(65) Prior Publication Data

US 2001/0055113 A1 Dec. 27, 2001

Related U.S. Application Data

(60) Provisional application No. 60/212,174, filed on Jun. 16, 2000.

(51) Int. Cl.[7] .............................. G01J 3/44; G01J 3/30; G01J 3/28
(52) U.S. Cl. ........................ 356/301; 356/317; 356/326
(58) Field of Search ................................ 356/300–337; 359/800, 809, 813, 819, 822, 823

(56) References Cited

U.S. PATENT DOCUMENTS

| 4,870,950 | A | * | 10/1989 | Kanbara et al. ............ 600/109 |
| 4,871,251 | A | * | 10/1989 | Preikschat et al. .......... 356/336 |
| 5,112,127 | A | | 5/1992 | Carrabba et al. |
| 5,256,880 | A | | 10/1993 | Loree et al. |
| 5,459,313 | A | | 10/1995 | Schrader et al. |
| 5,510,619 | A | | 4/1996 | Zachmann et al. |
| 5,534,997 | A | | 7/1996 | Schrader |
| 5,646,411 | A | | 7/1997 | Kain et al. |
| 5,713,364 | A | | 2/1998 | DeBaryshe et al. |
| 5,788,639 | A | * | 8/1998 | Zavislan et al. ............ 600/476 |
| 5,822,061 | A | | 10/1998 | Delhaye et al. |
| 5,847,400 | A | | 12/1998 | Kain et al. |
| 5,880,465 | A | * | 3/1999 | Boettner et al. ............ 250/234 |
| 5,978,083 | A | * | 11/1999 | Muller ........................ 356/450 |

FOREIGN PATENT DOCUMENTS

WO    WO 99/01750    1/1999

* cited by examiner

Primary Examiner—Zandra V. Smith
Assistant Examiner—Gordon J. Stock, Jr
(74) Attorney, Agent, or Firm—Brinks Hofer Gilson Lione (57) ABSTRACT

For identifying black plastics effectively and rapidly with a laser-powered identification probe, it is desirable to maintain full laser power while reducing the power density. This is achieved by providing the probe with a moving lens that disperses the 0.5 mm laser spot over a larger area typically of about 5 mm in diameter. The entire signal from the larger (5 mm) diameter is collected at the same spot in the fiber bundle within the probe that leads to a Raman or other spectral analyzer. There are no other modifications required for the rest of the system as the moving lens does not affect the collection efficiency of the characteristic signal from the sample.

30 Claims, 4 Drawing Sheets

SPECTRAL ANALYSIS SYSTEM WITH MOVING OBJECTIVE LENS

This application claims benefit of Provisional application No. 60/212,174 filed Jun. 16, 2000.

BACKGROUND OF THE INVENTION

1. Field of the Invention

The present invention generally relates to spectral analysis systems that can be used for polymer identification. More particularly, the invention particularly relates to improvements in Raman polymer identification systems to permit effective and rapid identification of darkly colored plastics.

2. Description of the Prior Detection Method

Many plastics that should be recycled, particularly in the automotive industry, are black or highly pigmented. Such darkly colored plastics have proven to be the most difficult to identify using existing plastic identification technologies. Due to the strong optical absorption of black plastics, most of the signal needed to perform a spectroscopic identification is absorbed by the sample and thus unavailable for detection. At the same time, absorption may also lead to a significant thermal change such as a rapid heating, melting and even burning of the plastic sample during the identification process. Thus, not only are the signal levels from black plastics very small, but also these weak signals, particularly Raman signals, may be further obscured by large interfering backgrounds due to the thermally induced changes in the plastics including smoking. For example, white plastics can be easily and rapidly identified in 0.1 seconds with a Raman spectrometer, such as that disclosed in International Publication WO 99/01750, using a 1 Watt diode laser power, while black plastics cannot be identified under the same conditions due to laser induced detrimental changes. The power density reaches 5 $W/mm^2$ when a 1 W laser at a wavelength of 800 nm is focused to a 0.5 mm diameter focal spot.

In order to avoid laser induced detrimental changes in the plastic, it is necessary to decrease the laser power density on the surface of the black plastic. One way to reduce laser power density is to reduce total laser power that illuminates the surface of the black plastic. But at same time, in order to accumulate enough signal for identification, the signal collection time has to be increased proportionally. Obviously, this is not acceptable for rapid identification. The other way to reduce the power density of the laser is to increase the size of the laser spot that illuminates the surface of the plastic, while still maintaining a sufficiently high laser power of 1 Watt to allow rapid identification. Experiments have shown that to avoid laser induced detrimental changes in black plastic samples, in the case of 1 Watt total laser power at wavelength 800 nm, the size of the laser spot illuminating the surface of a black plastic sample needs to be increased 40 times, to a size that is greater than 3 mm in diameter. As a consequence, the signal acceptance area of the collection fiber bundle and the acceptance area of the spectrograph (slit-height times slit-width) must also be increased 40 times. It is almost impossible to achieve this from a technical point of view. Enlarging the laser spot size without changing the optical train and components would cause the signal from the sample to overfill the collection fiber bundle and thus decrease the collected signal intensity.

Thus, there exists a need for a quick yet effective way to identify materials such as darkly colored plastics using spectral analysis, particularly Raman spectroscopy.

BRIEF SUMMARY OF THE INVENTION

In order to aid in the understanding of the present invention, it can be stated in essentially summary form that it is directed to a moving objective lens in a traditional system employing spectral analysis such as a Raman polymer identification system. By moving the objective lens, the laser beam can be distributed to a focal plane, while the spectral signal from the moving laser spot can still be collected back to the same point as if the objective lens were stationary. As a result, the average power density of the moving laser spot can be reduced to a point that no light induced detrimental degradation such as undue heating, melting and burning of the plastic sample will occur, while still maintaining the same laser beam power level. At the same time the power level of the spectral signal being returned from the sample is maintained at a level sufficient to make very rapid identification of the character and composition of the sample by an analysis of the Raman or other spectral signal.

In a preferred system, an optical fiber bundle conducts the spectral signal from the sampling optics situated to receive the characteristic spectrum produced from the sample to a spectral analyzer. Even though the lens is moving, the spectral signal returns from the sample to the same point of the entrance end of the fiber bundle as if the lens were stationary. This means the spectral signal is not reduced by the movement of the lens. The terms moving and movement as employed in this application is to be given the broadest possible meaning and include a patterned or random movement of the lens so that the laser energy directed toward the sample is distributed over an area in the focal plane of the objective lens larger than would be achieved were the lens not subjected to movement. Examples of movement that are easily achieved to obtain the desired results include rotation of an eccentrically positioned objective lens, and one-or two-dimensional translational vibration of an objective lens in a plane roughly parallel to the sample surface.

The invention provides a convenient way to solve the problems faced by traditional Raman or other spectral polymer identification methodologies that prevent the rapid and effective identification of darkly colored plastics. The invention can be better understood from the following description when considered in conjunction with the accompanying drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best mode contemplated for carrying out the invention in a commercial environment, although it should be understood that various modifications can be accomplished within the parameters of the present invention.

Figure 2:
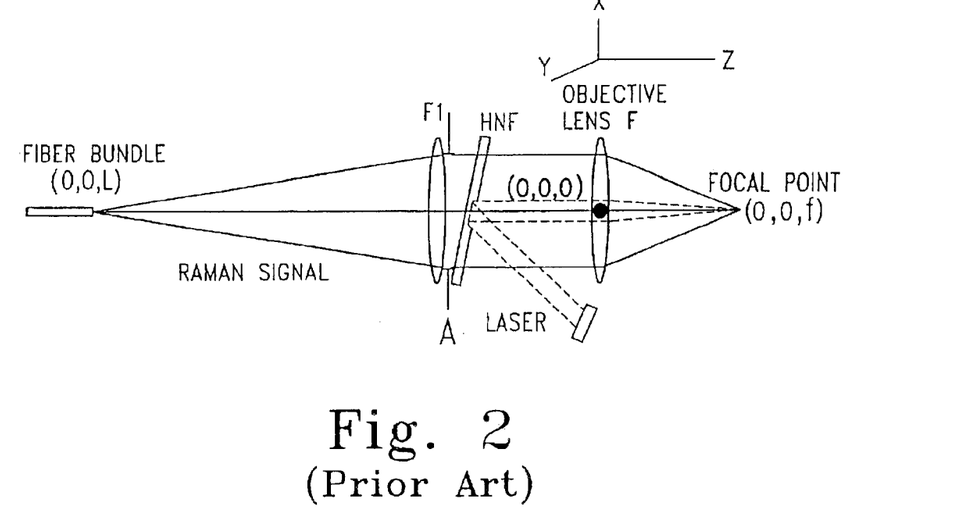
FIG. 2 shows the laser beam and Raman signal path in a traditional Raman Polymer Identification system.

In a traditional Raman Polymer Identification system, such as that disclosed in International Publication WO 9901750, the general signal collection setup can be illustrated as in FIG. 2. The objective lens F is placed at (0,0,0). The collimated diode laser beam is focused by the objective lens F at focal point (0,0,f). The Raman signal from the excitation focal point (0,0,f) is re-collimated by the objective lens F and passed through the Holographic Notch Filter (HNF), then collected by lens F1 to fiber bundle at focal point (0,0,L).

Figure 1:
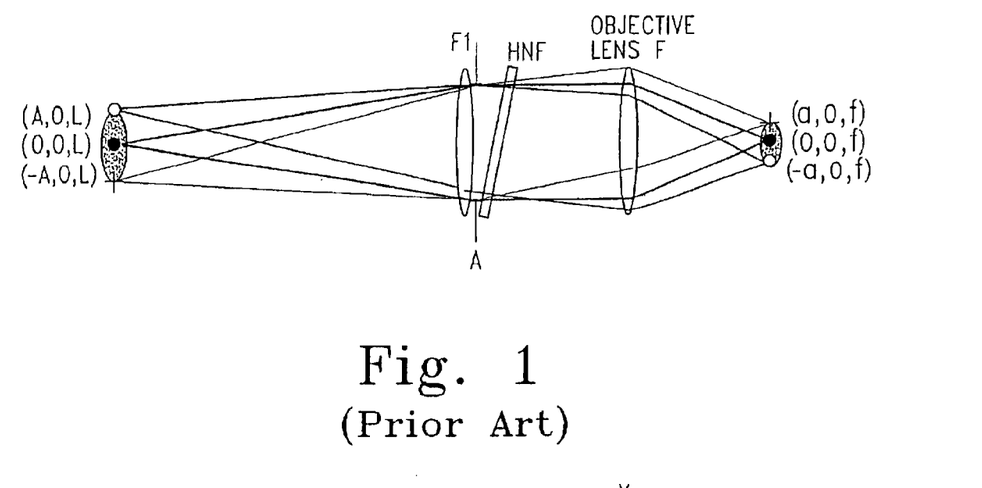
FIG. 1 shows that when increasing the laser spot size so as to decrease or reduce the power density to a manageable level with a stationary objective lens the Raman signal acceptance area of the fiber bundle needs to be increased.

Experiments have shown that to avoid laser induced detrimental changes in black plastic samples, in the case of 1 Watt total laser power at wavelength 800 nm, the size of the laser spot illuminating the surface of a black plastic sample needs to be increased 40 times, to a size that is greater than 3 mm in diameter. FIG. 1 schematically shows such an enlargement, as compared to FIG. 2, of the illuminated surface to cover the area centered on (0,0,f) but extending from (a,0,f) to (-a,0,f). As a consequence of such an enlargement of the laser illumination area, the Raman signal is spread over an area centered on (0,0,L) extending from (A,0,L) to (-A,0,L) thus requiring an acceptance area of the collection fiber bundle, shown in FIG. 2, to be correspondingly increased. As described earlier, the enlargement of the laser spot size without changing the optical train components would cause the signal from the sample to overfill the collection fiber bundle and thus decrease the collected signal intensity to an unsatisfactory level.

Figure 3:
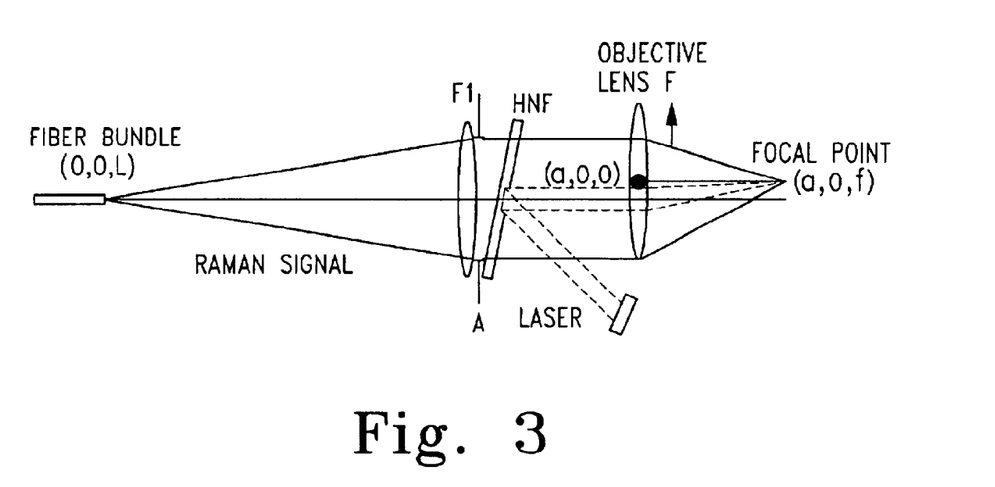
FIG. 3 shows the laser beam and Raman signal path in a traditional Raman Polymer Identification system when the objective lens F is off center.

When the center of the objective lens F is moved to (a,0,0) as in FIG. 3, the focal point of laser beam will be moved to (a,0,f). The Raman signal from the excitation focal point (a,0,f) will be re-collimated by the objective lens F, which is centered at (a,0,0) and passed through the HNF. The Raman signal is then collected by lens F1 at the same point of fiber bundle, (0,0,L). In other words, no matter how the objective lens is moved, as long as it is on the same vertical plane, the Raman signal will always be collected at same point (0,0,L).

Figure 4:
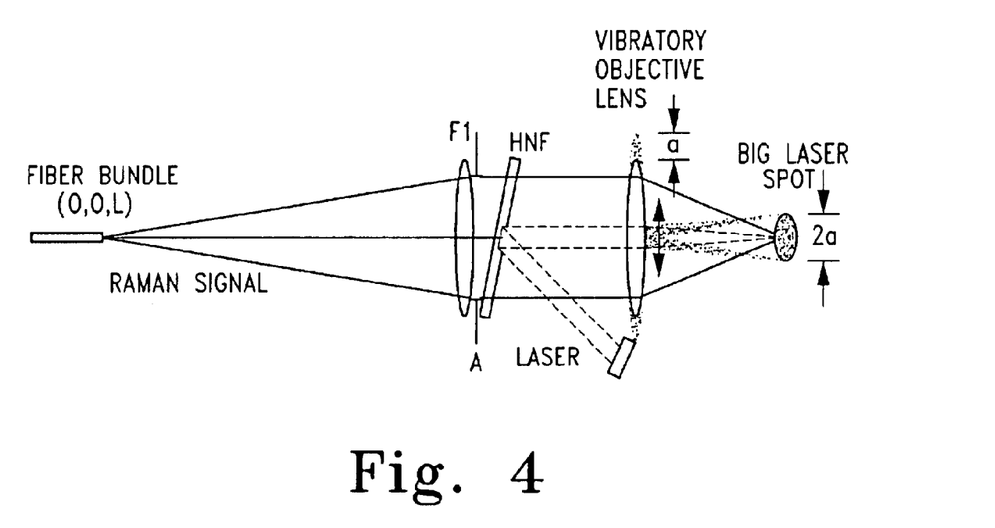
FIG. 4 shows the laser beam and Raman signal path in a modified Raman Polymer Identification system with an embodiment of the inventive moving objective lens.

When the objective lens F is vibrated on a plane that is perpendicular to the optical axis shown in FIGS. 3 & 4, the laser spot that is formed on the sample surface will vibrate on the focal plane synchronously with the objective lens movement in the X and Y directions. With the increase of amplitude of the vibration on the objective lens, the scan area of the focal spot will increase. By adopting random, noisy or complex functions for the amplitude of the objective lens in the X and Y directions, the movement of the laser spot will effectively smear or spread out nearly uniformly over the spot area. As a result, the average power density of the vibrated laser spot can be reduced proportionally until it is lower than the laser induced detrimental change threshold of the sample.

An important key is to recognize that the time it takes for light from the laser to travel from the objective lens to the sample and for the excited Raman signal to travel back from sample to the objective lens to be re-collimated is less than 1 nano-second (if focal length f<15 cm). If the vibration frequency is 50 Hz and the vibration amplitude is <2.5 mm, the mechanical movement of the objective lens F due to the vibration is less than 1 nm during this 1 nano-second time interval. That means the Raman signal will be collected through lens F and F1 and reach the same point of fiber bundle (0,0,L), so the signal will not be weakened due to the mechanical movement of objective lens F. The result of lens vibration with 50 Hz and 2.5 mm amplitude makes the lens spot from 0.5 mm to equivalent laser spot of 5 mm in diameter, which leads to a 100-fold reduction in power density.

This key point of invention is that random, noisy, complex or other movement of the objective lens in the X-Y plane has the same effect as increasing the size of laser spot, yet there is no need to modify the optical system that collects the Raman signal and still maintain the same signal collection efficiency. By applying this invention, the average laser spot size can be easily changed by modifying the amplitude limits on the movement of the objective lens. The present invention has the advantage of averaging the Raman signal that is collected from the test sample over the spot area, which is important when the sample has non-uniformly distributed chemical components. Generally the movement of the objective lens should have a linear velocity component of between about 0.1 to 100 cm/sec.

Figure 5:
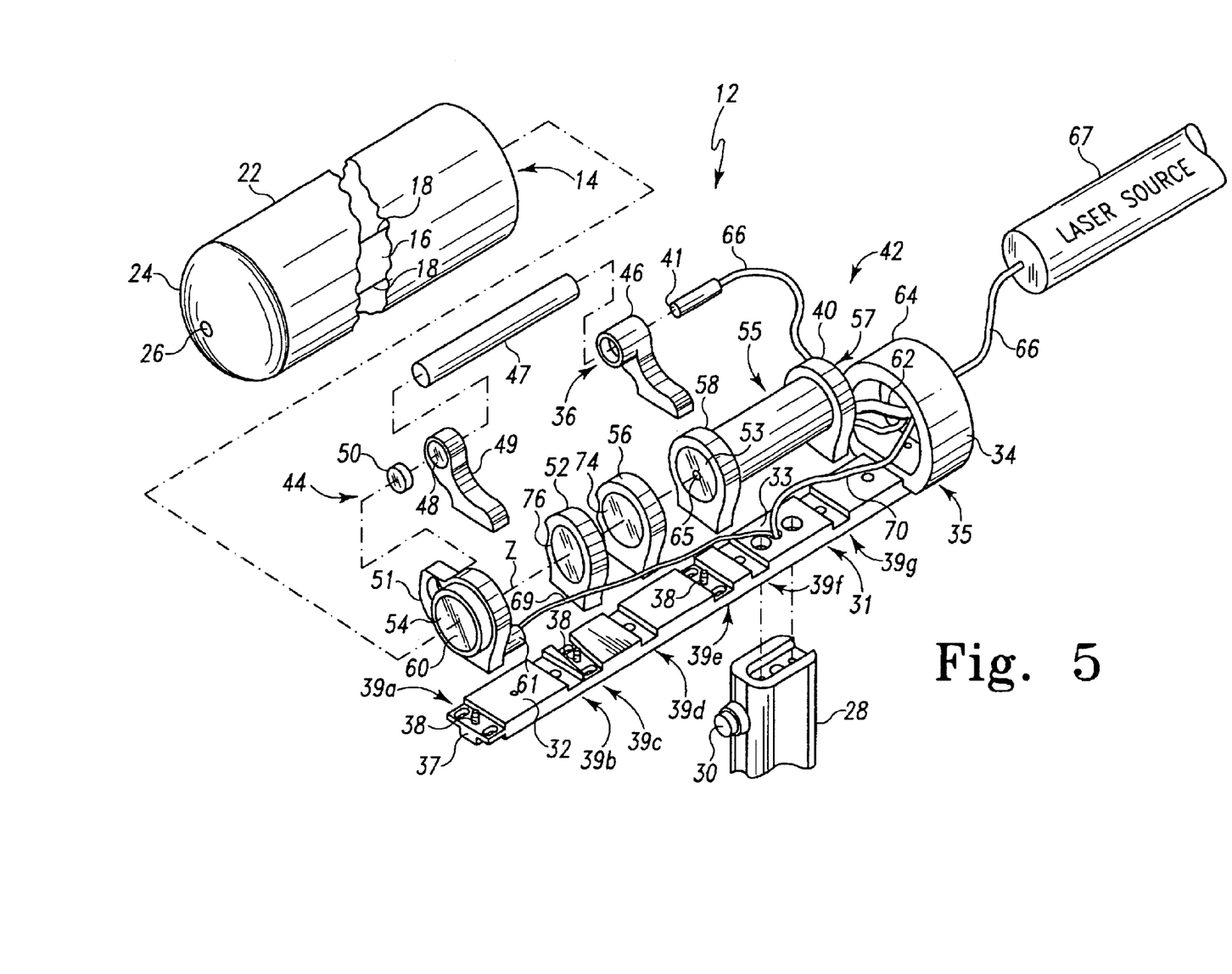
FIG. 5 is an exploded perspective view of an identification probe incorporating a spatial filter of the present invention.

In a commercial embodiment, the probe 12 is configured to illuminate and collect light scattered from samples, not shown, that are situated in front of optical window 26 at a front end of nose cone 24 as shown in FIG. 5. Probe 12 includes a housing 14 in the form of a generally cylindrical member 22 and includes a nose cone 24 containing an optical window 26. The optical window 26 can comprise a simple opening through which light can pass, but in a preferred embodiment the optical window 26 comprises a sapphire window mounted within the nose cone 24 to protect the optics within probe 12 from airborne dust and assorted particles. The probe 12 can be easily positioned relative to a sample by means of handle 28 that can constitute a coupling structure for robotic manipulation. A trigger 30 is situated on the handle 28 for easy operation by an operator's index finger. Alternatively, the trigger 30 can be computer controlled. A longitudinal rail 32 is fixed to handle 28 or equivalent robotic coupling structure to provide a foundation for the optical components within the probe 12. The generally cylindrical housing member 22 includes a longitudinal slot 16, the edges 18 of which contact opposing edges of the longitudinal rail 32. The housing 22 is completed by back wall 34 having an outer perimeter 64. In the preferred embodiment, the generally cylindrical housing member 22 has an internal diameter of about 6.0 cm. It is understood, however, that the internal diameter and other dimensions of housing member 22 can vary in accordance with the constraints imposed on the system by its intended use as well as the components to be housed therein. In the preferred embodiment, the housing member 22, nose cone 24, longitudinal rail 32, and back wall 34 are construction of aluminum that has been black anodized. However, a wide variety of metals, copolymers, and composites can be used to construct probe 12 in accordance with the present invention.

The longitudinal rail 32 includes a lower surface 31, an upper surface 33, a rearward end 35, and a forward end 37 as shown in FIG. 5. A plurality of lateral slots 39a through 39g are milled into the upper surface 33 of the longitudinal rail 32 generally perpendicular to the length dimension of the longitudinal rail 32, except slot 39c which is inclined at an angle of about 10°. Pivot pins 38 are fixed in the center of each of the lateral slots 39a and 39c to permit small adjustments in the alignment of the supports fastened therein. Probe 12 employs sampling optics 42 to collect the scattered Raman radiation, discriminating with an extinction ratio of about $10^6$ (1 ppm) or better for the Raman-shifted component. Support 46 is fastened in slot 39e to hold lens 36 adjacent the exit end 41 of optical fiber 66 carrying light from a laser source 67. Support 49 is fastened in slot 39b to hold a band pass filter 48, which controls the wavelength and deviation of the source light directed toward the sample through optical window 26. Support 51 is fastened in slot 39a to hold an objective lens system 54 and mirror 50. Supports 46 and 49 also support the ends of baffling tube 47 creating a specific segregated region 44 within the housing 22 between the lens 36 and band pass filter 48.

Support 52 is fastened in inclined slot 39c to hold optical filter 76, which can be an interference or holographic filter and preferably is a long pass filter designed to reflect light having a wavelength equal to or less than the wavelength of the laser source and transmit light having a wavelength longer than the laser source. Support 56 is fastened in slot 39d to hold a lens 74 having a focal length selected to direct the Raman or other characteristic spectral signal passing through the optical filter 76 on to the entrance end 53 of spatial filter 55. Support 58 is fastened in slot 39e to hold the entrance end 53 of spatial filter 55. The entrance end 53 of the spatial filter 55 includes an aperture 65 that is generally round and preferably has an area of about 1 mm² or less. Support 40 is fastened in slot 39g to hold the exit end 57 of spatial filter 55 that also holds the entrance end of optical fiber bundle 62 that carries the characteristic Raman or other spectral signal produced from a sample through the fiber-optic bundle 62 to appropriate instruments capable for evaluating the spectral signal. The specific structure of the preferred embodiment of the spatial filter 55 is disclosed in U.S. patent application Ser. No. 09/447,878 filed Nov. 23, 1999, now U.S. Pat. No. 6,310,686, which is hereby incorporated by reference.

Figure 6:
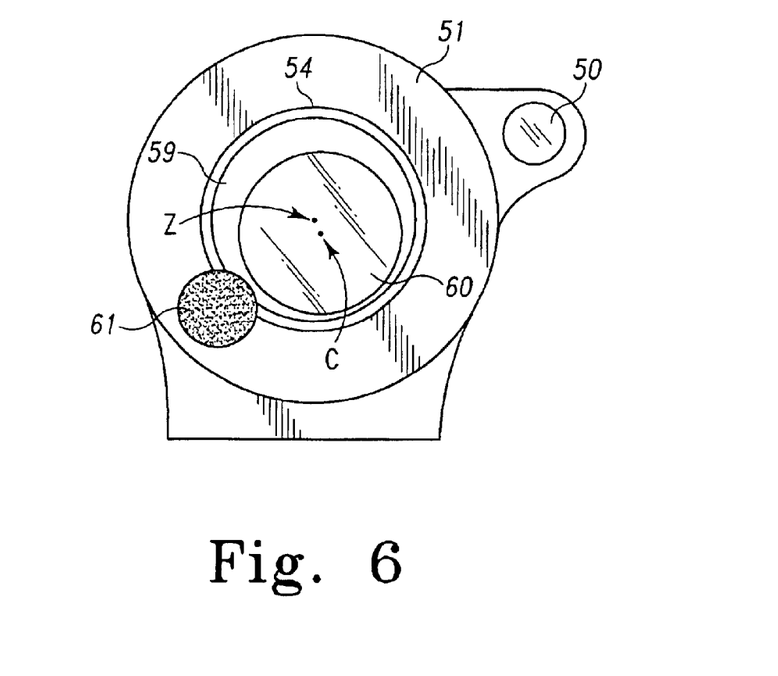
FIG. 6 shows an objective lens system including a moving objective lens.

A convenient method of achieving the desired movement of the objective lens 60 is to mount the lens in a lens holder 59 as shown in FIG. 6 so that the lens center C is displaced from the optical axis Z. The objective lens 60 is thus eccentrically mounted with respect to the optical axis Z of the probe 12 and then simply rotated by motor 61. This rotation causes the focal point of the lens 60 to rotate in the plane of the lens holder 59, which is generally parallel to the surface of the sample, about the optical axis Z of the probe 12, describing a circle that has radius equal to the eccentricity of the lens mount 59. In the preferred embodiment, the rotating objective lens 60 is mounted adjacent to or in the nose 24 of the probe 12. The lens mount 59 is rotated by the electrical motor 61 upon depression of the trigger 30, which can also initiate the emission from the laser source through electrical cables 69 and 70. The rotation of the lens holder 59 has the effect of causing the laser spot to scribe a circle on the test sample.

Figure 7:
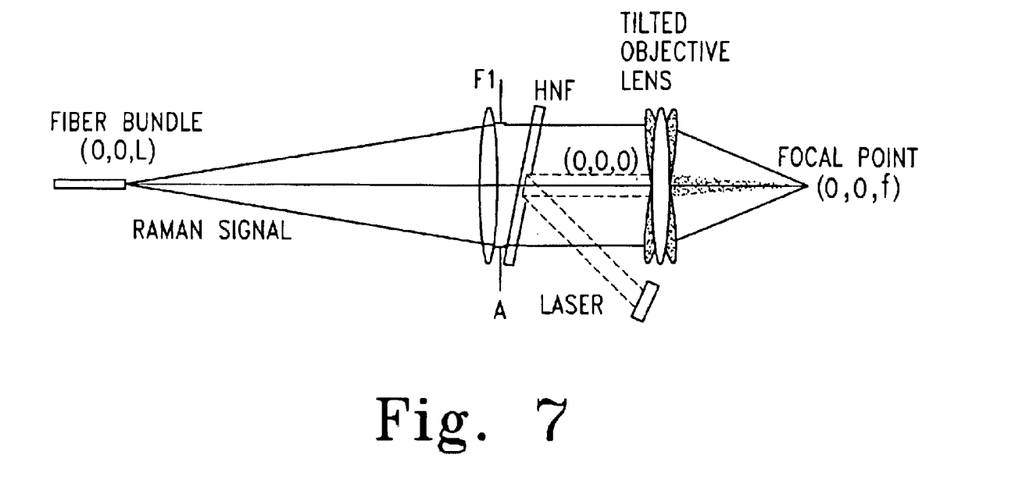
FIG. 7 shows that tilting movements do not affect the collection efficiency of Raman signal.

The amount of lens displacement from the optical axis and the speed of rotation can be selected so that the power density of the excitation laser beam is reduced until it is lower than the laser induces detrimental change threshold of the sample. For example, a lens can be mounted in a lens holder so that the lens center is displaced from the optical axis by about 1.5 mm, which causes the focal point of the excitation laser beam to scribe a circle having a diameter of about 3.0 mm as shown in FIG. 7. When this lens is rotated, the power density of the excitation laser beam is distributed over a circle described by the rotation of the focal spot. In the limit of a rotation rate that is faster than thermal diffusion, the steady-state power density falls by a factor of A/A', where A is the area of the static focal spot and A' is the area of the ring illuminated by the rotating spot. This limiting ratio is described by the formula r/4R, where r is the radius of the focal spot and R is the radius of the ring described by the rotation of the focal spot. The eccentricity of the lens mounting can be from about 0.05 to 1.0 cm while the movement of the lens holder varies between about 0.1 and 100 rev/sec. Correspondingly, when the lens holder is vibrated at a frequency of from about 0.1 to 100 Hz, the amplitude of the vibration can be varied between about 1.0 and 0.01 cm.

It should be noticed that any tilt movement during the objective lens vibration will not affect the collecting efficiency of Raman or other spectral signal illustrated In FIG. 7. In other words, there is no strict requirement for the accuracy of the objective lens movement, although significant translational movements of the objective lens in the Z direction could affect the collimation of the returning spectral signal by the objective lens 60.

Although the invention has been described in detail with reference to a preferred embodiment, variations and modifications exist within the scope and spirit of the invention as described and defined in the following claims.

What is claimed is:

1. Apparatus for identifying the composition of a sample, the apparatus comprising:

a light source of known wavelength and deviation, radiation optics coupled to the light source so that light emitted from the light source is directed toward a region on a sample surface causing the sample to produce a characteristic spectrum, sampling optics situated to receive the characteristic spectrum produced from the sample and direct it the characteristic spectrum toward a spectral analyzer, and an objective lens common to both the radiation optics and the sampling optics, a holder for the objective lens, the objective lens being eccentrically mounted within the lens holder, and a motor for rotating the objective lens holder in a plane generally parallel to the sample surface so that the light emitted from the light source moves relative to the sample.

2. The apparatus of claim 1 wherein the radiation optics and sampling optics share a common filter, the filter reflecting the light emitted from the light source toward the sample, the filter blocking light at the wavelength of the light source from entry into the spectral analyzer.

3. The apparatus of claim 2 further comprising a band pass filter situated at an output of the light source to define further the deviation of the source.

4. The apparatus of claim 2 further comprising a probe including a housing having an optical window, the radiation optics optically coupling the light source to the housing optical window so that light emitted from the light source is directed through the window toward a sample.

5. The apparatus of claim 4 wherein the probe housing includes a handle to permit manipulation of the probe and further comprises a trigger coupled to the light source.

6. The apparatus of claim 4 wherein the housing comprises an elongated rail having a lower and an upper surface and a tubular member including a longitudinal slot receiving the rail so that an axis of revolution of the tubular member is parallel to the rail upper surface an is aligned with said optical window.

7. The apparatus of claim 6 further comprising a plurality of supports fixed to the rail upper surface for supporting optical elements to intersect the axis of revolution, a back plate closing one end of the tubular member, and a nose cone closing another end of the tubular member, the nose cone containing the optical window.

8. The apparatus of claim 6 further comprising a band pass filter situated in the housing in spaced relation from the light source, and a baffling tube fixed within the housing contiguous to the band pass filter to form a segregated region within the housing for absorbing radiation reflected by the band pass filter.

9. The apparatus of claim 5 wherein said trigger is connected to said motor so that depression of the trigger causes movement of the objective lens holder in a plane generally perpendicular to an axis of the lens holder passing through the optical window.

10. The apparatus of claim 9 wherein the movement of the objective lens holder is between about 0.1 and 100 cm/sec.

11. The apparatus of claim 9 wherein the movement of the objective lens holder is at a frequency of between about 0.1 and 100 Hz.

12. The apparatus of claim 9 wherein the movement of the objective lens holder is rotational between about 0.1 and 100 rev/sec.

13. The apparatus of claim 12 wherein the objective lens is eccentrically positioned within the lens holder by about 0.05 to 1.0 cm.

14. Apparatus for identifying the composition of a sample, the apparatus comprising:
a probe including a housing having an optical window located on an axis of the probe, and a light source of known wavelength and deviation situated within the probe,
radiation optics coupled to the light source so that light emitted from the light source is directed through the optical window toward a region on a sample surface causing the sample to produce a characteristic spectrum,
sampling optics situated to receive the characteristic spectrum produced from the sample through the optical window and direct it the characteristic spectrum toward a spectral analyzer, and
an objective lens common to both the radiation optics and the sampling optics, a holder for the objective lens situated adjacent to the optical window, the objective lens being eccentrically mounted within the lens holder, and a motor for rotating the objective lens holder in a plane generally perpendicular to the probe axis so that the light emitted from the light source moves relative to the sample.

15. The apparatus of claim 14 wherein the movement of the objective lens holder is rotational between about 0.1 and 100 rev/sec.

16. The apparatus of claim 14 wherein the objective lens is eccentrically positioned within the lens holder by about to 1.0 cm.

17. The apparatus of claim 14, 15, or 16 wherein the probe housing includes a handle to permit manipulation of the probe and further comprises a trigger coupled to the light source and the motor so that depression of the trigger causes movement of the objective lens holder in a plane generally perpendicular to an axis of the probe housing passing through the optical window.

18. The apparatus of claim 17 wherein the radiation optics and sampling optics share a common filter, the filter reflecting the light emitted from the light source toward the sample, the filter blocking light at the wavelength of the light source from entry into the spectral analyzer.

19. The apparatus of claim 17 wherein the housing comprises an elongated rail having a lower and an upper surface and a tubular member including a longitudinal slot receiving the rail so that an axis of revolution of the tubular member is parallel to the rail upper surface and is aligned with said optical window.

20. The apparatus of claim 19 further comprising a plurality of supports fixed to the rail upper surface for supporting optical elements to intersect the axis of revolution, a back plate closing one end of the tubular member, and a nose cone closing another end of the tubular member, the nose cone containing the optical window.

21. The apparatus of claim 19 further comprising a band pass filter situated in the housing in spaced relation from the light source, and a baffling tube fixed within the housing contiguous to the band pass filter to form a segregated region within the housing for absorbing radiation reflected by the band pass filter.

22. The apparatus of claim 17 further comprising a band pass filter situated at an output of the light source to define further the deviation of the source.

23. Apparatus for identifying the composition of a sample, the apparatus comprising:
a probe including a housing having an optical window, the housing comprises an elongated rail having a lower and an upper surface and a tubular member including a longitudinal slot receiving the rail so that an axis of revolution of the tubular member is parallel to the rail upper surface and is aligned with said optical window,
a light source of known wavelength and deviation coupled to the probe, radiation optics coupled to the light source so that light emitted from the light source is directed through the optical window toward a region on a sample surface causing the sample to produce a characteristic spectrum,
sampling optics situated to receive the characteristic spectrum produced from the sample and direct the characteristic spectrum toward a spectral analyzer, the radiation optics and sampling optics sharing a common filter, the filter reflecting the light emitted from the light source toward the sample, the filter blocking light at the wavelength of the light source from entry into the spectral analyzer,
a band pass filter situated in the housing in spaced relation from the light source, and a baffling tube fixed within the housing contiguous to the band pass filter to form a segregated region within the housing for absorbing radiation reflected by the band pass filter, and
an objective lens common to both the radiation optics and the sampling optics, a holder for the objective lens, and apparatus for moving the objective lens holder in a plane generally parallel to the sample surface.

24. The apparatus of claim 23 further comprising a motor for vibrating the lens holder to achieve movement of the light on the sample surface.

25. The apparatus of claim 23 wherein the probe housing includes a handle to permit manipulation of the probe and further comprises a trigger coupled to the light source.

26. The apparatus of claim 25 wherein the trigger is coupled to the objective lens holder moving apparatus so that depression of the trigger causes movement of the objective lens holder in a plane generally perpendicular to said axis of the holder passing through the optical window.

27. The apparatus of claim 23 further comprising a plurality of supports fixed to the rail upper surface for supporting optical elements to intersect the axis of revolution, a back plate closing one end of the tubular member, and a nose cone closing another end of the tubular member, the nose cone containing said optical window.

28. The apparatus of claim 23 wherein the movement of the objective lens holder is between about 0.1 and 100 cm/sec.

29. The apparatus of claim 23 wherein the movement of the objective lens holder is at a frequency of between about 0.1 and 100 Hz.

30. Apparatus for identifying the composition of a sample, the apparatus comprising:

a probe including a housing having an optical window and a light source of known wavelength and deviation, the housing having a handle to permit manipulation of the probe with a trigger coupled to the light source, radiation optics coupled to the light source so that light emitted from the light source is directed through the optical window toward a region on a sample surface, sampling optics situated to receive the characteristic spectrum produced from the sample and direct the characteristic spectrum toward a spectral analyzer, the radiation optics and sampling optics sharing a common filter, the filter reflecting the light emitted from the light source toward the sample, the filter blocking light at the wavelength of the light source from entry into the spectral analyzer, and an objective lens common to both the radiation optics and the sampling optics, a holder for the objective lens, a motor for moving the objective lens holder, the trigger being coupled to the motor so that depression of the trigger causes movement of the objective lens in a plane generally parallel to the sample surface so that the light emitted from the light source moves relative to the sample.

* * * * *

UNITED STATES PATENT AND TRADEMARK OFFICE
CERTIFICATE OF CORRECTION

PATENT NO. : 6,809,812 B2  
APPLICATION NO. : 09/877773  
DATED : October 26, 2004  
INVENTOR(S) : HuiquYin Page 1 of 1

It is certified that error appears in the above-identified patent and that said Letters Patent is hereby corrected as shown below:

Column 7, line 50 in claim 16 --0.05-- is inserted after the word "about" and before the word "to."

Signed and Sealed this

Seventeenth Day of October, 2006

JON W. DUDAS  
*Director of the United States Patent and Trademark Office*

UNITED STATES PATENT AND TRADEMARK OFFICE
CERTIFICATE OF CORRECTION

PATENT NO. : 6,809,812 B2 Page 1 of 1
APPLICATION NO. : 09/877773
DATED : October 26, 2004
INVENTOR(S) : Huiqu Yin It is certified that error appears in the above-identified patent and that said Letters Patent is hereby corrected as shown below:

Column 7, line 50 in claim 16 --0.05-- is Inserted after the word "about" and before the word "to."

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,809,812 B2
APPLICATION NO. : 09/877773
DATED : October 26, 2004
INVENTOR(S) : Huiqu Yin It is certified that error appears in the above-identified patent and that said Letters Patent is hereby corrected as shown below:

Column 7, line 50 in claim 16 --0.05-- is inserted after the word "about" and before the word "to".

Signed and Sealed this

Nineteenth Day of December, 2006

JON W. DUDAS
*Director of the United States Patent and Trademark Office*